US009880563B2

(12) United States Patent
Fisher et al.

(10) Patent No.: US 9,880,563 B2
(45) Date of Patent: Jan. 30, 2018

(54) GEOGRAPHIC SURVEY SYSTEM FOR VERTICAL TAKE-OFF AND LANDING (VTOL) UNMANNED AERIAL VEHICLES (UAVS)

(71) Applicant: AeroVironment, Inc., Simi Valley, CA (US)

(72) Inventors: Christopher Eugene Fisher, Leo, IN (US); Jason Sidharthadev Mukherjee, Simi Valley, CA (US); William Arden Lott, Simi Valley, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 37 days.

(21) Appl. No.: 15/040,957

(22) Filed: Feb. 10, 2016

(65) Prior Publication Data

US 2017/0023949 A1    Jan. 26, 2017

Related U.S. Application Data

(60) Provisional application No. 62/115,033, filed on Feb. 11, 2015.

(51) Int. Cl.
*G06F 19/00* (2011.01)
*G05D 1/10* (2006.01)
(Continued)

(52) U.S. Cl.
CPC ............. *G05D 1/102* (2013.01); *B64C 29/02* (2013.01); *B64C 39/024* (2013.01); *B64D 47/08* (2013.01);
(Continued)

(58) Field of Classification Search
CPC ........ G05D 1/102; B64C 29/02; B64C 39/024; B64C 2201/088; B64C 2201/123;
(Continued)

(56) References Cited

U.S. PATENT DOCUMENTS 2,151,128 A    3/1939  Looney
2,961,189 A    11/1960 Doak
(Continued)

FOREIGN PATENT DOCUMENTS

WO    2006022654 A1    3/2006
WO    2009066073 A1    5/2009
(Continued)

OTHER PUBLICATIONS

Oosedo, Konno, Matumoto, Go, Masuko, Abiko, and Uchiyama, "Design and Simulation of a Quad Rotor Tail-Sitter Unmanned Aerial Vehicle," Tohoku University, IEEE, 2010, 978-1-4244-9315-9/10.
(Continued)

*Primary Examiner* — Gertrude Arthur Jeanglaude
(74) *Attorney, Agent, or Firm* — Michael Zarrabian; Pejman Yedidsion; Eric Aagaard

(57) ABSTRACT

A method of unmanned aerial vehicle (UAV) operation, including: receiving from a customer a first data request, the first data request having: a first geographic coverage area; and a refresh rate for the first geographic coverage area; planning a first plurality of flight missions to accomplish the first data request; uploading flight missions data representing the first plurality of flight missions into a UAV pod; and deploying the UAV pod.

16 Claims, 8 Drawing Sheets

(51) Int. Cl.

| | |
|---|---|
| *B64C 29/02* | (2006.01) |
| *B64C 39/02* | (2006.01) |
| *B64D 47/08* | (2006.01) |
| *B64F 1/00* | (2006.01) |
| *G06F 17/30* | (2006.01) |
| *G08G 5/00* | (2006.01) |
| *G06Q 30/00* | (2012.01) |

(52) U.S. Cl.
CPC ........ *B64F 1/005* (2013.01); *G06F 17/30241* (2013.01); *G08G 5/0034* (2013.01); *G08G 5/0069* (2013.01); *G08G 5/0091* (2013.01); *B64C 2201/021* (2013.01); *B64C 2201/088* (2013.01); *B64C 2201/123* (2013.01); *B64C 2201/141* (2013.01); *B64C 2201/201* (2013.01); *G06Q 30/016* (2013.01)

(58) Field of Classification Search
CPC ........ B64C 2201/141; B64C 2201/201; B64D 47/08; B64F 1/005; G06F 17/30241; G08G 5/0034; G08G 5/0069; G08G 5/0091; G06Q 30/016
USPC ...... 701/3, 11, 13, 14, 15, 16, 25; 244/75 R, 244/110
See application file for complete search history.

(56) References Cited

U.S. PATENT DOCUMENTS

| 3,181,810 | A | 5/1965 | Olson |
|---|---|---|---|
| 4,410,151 | A | 10/1983 | Hoppner et al. |
| 4,814,711 | A | 3/1989 | Olsen et al. |
| 5,062,587 | A | 11/1991 | Wernicke |
| 5,289,994 | A | 3/1994 | Aguilera |
| 5,419,514 | A | 5/1995 | Ducan |
| 5,765,783 | A | 6/1998 | Albion |
| 6,056,237 | A | 5/2000 | Woodland |
| 7,472,863 | B2 | 1/2009 | Pak |
| 7,766,274 | B1 | 8/2010 | Jameson et al. |
| 8,146,855 | B2 | 4/2012 | Ismailov |
| 8,453,962 | B2 | 6/2013 | Shaw |
| 8,511,606 | B1 | 8/2013 | Lutke et al. |
| 8,590,828 | B2 | 11/2013 | Marcus |
| 8,602,348 | B2 | 12/2013 | Bryant |
| 8,616,492 | B2 | 12/2013 | Oliver |
| 8,695,916 | B2 | 4/2014 | Martin et al. |
| 8,733,690 | B2 | 5/2014 | Bevirt et al. |
| 8,800,912 | B2 | 8/2014 | Oliver |
| 8,979,032 | B1 | 3/2015 | Hester et al. |
| 9,102,401 | B2 | 8/2015 | Collins et al. |
| 9,302,783 | B2 | 4/2016 | Wang |
| 9,382,003 | B2 | 7/2016 | Burema et al. |
| 9,387,928 | B1 | 7/2016 | Gentry et al. |
| 9,429,945 | B2 | 8/2016 | Pulleti et al. |
| 9,527,605 | B1 | 12/2016 | Gentry et al. |
| 9,561,871 | B2 | 2/2017 | Sugumaran |
| 2005/0066806 | A1 | 3/2005 | Helms et al. |
| 2005/0178879 | A1 | 8/2005 | Mao |
| 2005/0231157 | A1 | 10/2005 | Sanders et al. |
| 2006/0249622 | A1 | 11/2006 | Steele |
| 2009/0236470 | A1 | 9/2009 | Goossen et al. |
| 2009/0294573 | A1 | 12/2009 | Wilson et al. |
| 2010/0131121 | A1 | 5/2010 | Gerlock |
| 2010/0157055 | A1 | 6/2010 | Pechatnikov |
| 2010/0252690 | A1 | 10/2010 | Hothi et al. |
| 2011/0168838 | A1 | 7/2011 | Hornback et al. |
| 2011/0180673 | A1 | 7/2011 | Lim |
| 2011/0264314 | A1 | 10/2011 | Parras |
| 2011/0303795 | A1 | 12/2011 | Oliver |
| 2012/0001020 | A1 | 1/2012 | Miralles et al. |
| 2012/0050090 | A1 | 3/2012 | Rudnisky et al. |
| 2012/0091257 | A1 | 4/2012 | Wolff et al. |
| 2012/0210853 | A1 | 8/2012 | Abershitz et al. |
| 2012/0318915 | A1 | 12/2012 | Gatzke |
| 2013/0161447 | A1 | 6/2013 | McGeer et al. |
| 2013/0318214 | A1 | 11/2013 | Tebay et al. |
| 2014/0032034 | A1 | 1/2014 | Raptopoulos et al. |
| 2014/0124621 | A1 | 5/2014 | Godzdanker et al. |
| 2014/0126838 | A1 | 5/2014 | Schultz et al. |
| 2014/0277834 | A1 | 9/2014 | Levien et al. |
| 2014/0316616 | A1 | 10/2014 | Kugelmass |
| 2015/0158598 | A1 | 6/2015 | You |
| 2015/0336669 | A1 | 11/2015 | Kantor et al. |
| 2016/0011592 | A1 | 1/2016 | Ihang et al. |
| 2016/0039542 | A1 | 2/2016 | Wang |
| 2016/0068265 | A1 | 3/2016 | Hoareau et al. |
| 2016/0137311 | A1 | 5/2016 | Peverill et al. |
| 2016/0196756 | A1 | 7/2016 | Prakash et al. |
| 2016/0229299 | A1 | 8/2016 | Streett |
| 2016/0253808 | A1 | 9/2016 | Metzler et al. |
| 2017/0160740 | A1 | 6/2017 | Srivastava et al. |

FOREIGN PATENT DOCUMENTS

| WO | 2011159281 A1 | 12/2011 |
|---|---|---|
| WO | 2015012935 A2 | 1/2015 |

OTHER PUBLICATIONS

International Search Report and Written Opinion for PCT/US16/17407 dated Jul. 27, 2016.
European Search Report for EP Application No. 14828680.0 dated Nov. 10, 2016.
First Office Action for CN Application No. 201480033924X dated Nov. 15, 2016.
Intellectual Property Office of Singapore Written Opinion for Application No. 11201508858P dated Sep. 5, 2016.
International Search Report and Written Opinion for PCT/US14/36863, dated Mar. 20, 2015.
International Search Report and Written Opinion for serial No. PCT/US16/17400, dated May 12, 2016.
International Search Report for PCT/US16/17417 dated Jul. 27, 2016.
International Search Report for PCT/US16/17540 dated May 23, 2016.
International Search Report for PCT/US16/17614 dated May 19, 2016.
Non-Final Office action for U.S. Appl. No. 14/270,320 dated Feb. 25, 2016.

GEOGRAPHIC SURVEY SYSTEM FOR VERTICAL TAKE-OFF AND LANDING (VTOL) UNMANNED AERIAL VEHICLES (UAVS)

CROSS-REFERENCE TO RELATED APPLICATIONS

This application claims priority to and the benefit of U.S. Provisional Patent Application No. 62/115,033, filed Feb. 11, 2015, the contents of which are hereby incorporated by reference herein for all purposes.

TECHNICAL FIELD

The field of the invention relates to unmanned aerial vehicle (UAV) systems, and more particularly to systems for operating a UAV autonomously.

BACKGROUND

Aerial geographic survey work for the agricultural and oil industries may be accomplished using unmanned aerial vehicles (UAVs) that generally reduce costs associated with such activities. Unfortunately, the desired geographic coverage area for the survey work may exceed the operational capabilities of the UAV for any single flight. A separate challenge may exist in that the geographic coverage area may also be located in a remote area, making retrieval of the survey data more difficult between survey flights.

A need continues to exist for extending the operational capabilities of UAVs and facilitating survey data retrieval in remote geographic areas.

SUMMARY

A method of unmanned aerial vehicle (UAV) operation includes receiving from a customer a first data request, the first data request including a first geographic coverage area and a refresh rate for the first geographic coverage area, planning a first plurality of flight missions to accomplish the first data request, uploading flight missions data representing the first plurality of flight missions into a UAV pod, and deploying the UAV pod. The first data request may also include one of a ground resolution or ground surface distance (GSD). The method may also include providing a two-rotor UAV with flight mission data for one of the first plurality of flight missions from the UAV pod, launching the two-rotor UAV from the UAV pod to perform the one of the first plurality of flight missions, receiving the two-rotor UAV on the UAV pod, and receiving in the UAV pod a first flight survey data obtained from the one of the first plurality of flight missions from the two-rotor UAV. In such embodiments, the method may include transmitting the first flight survey data from the UAV pod. The method may include providing the UAV with second flight mission data representing a second one of the plurality of flight missions from the UAV pod, autonomously launching the two-rotor UAV from the UAV pod to perform the second one of the first plurality of flight missions, receiving the two-rotor UAV on the UAV pod after completing the second one of the first plurality of flight missions, and receiving a second survey data in the UAV pod from the UAV so that the launching and receiving of the two-rotor UAV to accomplish the second one of the plurality of flight missions happens autonomously and without active human intervention. In such embodiments, the method may include providing the second flight survey data from the UAV pod or receiving the first and second survey data from the UAV pod. In such embodiments, the receiving the first and second survey data from the UAV pod may include receiving the first and second survey data wirelessly at a remote operational support center. Alternatively, the receiving of the first and second survey data from the UAV pod may include removing physical memory from the UAV pod. The method may further include performing data analysis of the first and second survey data and providing the data analysis to the customer. In such embodiments, the method may include providing the two-rotor UAV with a third flight mission data representing a third one of the plurality of flight missions from the UAV pod and receiving the two-rotor UAV on a second UAV pod. The method may also include receiving a second two-rotor UAV in the second UAV pod or retrieving the UAV pod, uploading a second flight missions data representing a second plurality of flight missions into the UAV pod to accomplish a second data request, and re-deploying deploying the UAV pod. The method may also include providing a second two-rotor UAV with a third flight mission data representing a third one of the first plurality of flight missions from the UAV pod and may include autonomously launching the second two-rotor UAV from the UAV pod to perform the third one of the first plurality of flight missions, receiving the second two-rotor UAV on the UAV pod after completing the third one of the first plurality of flight missions, and receiving a third survey data in the UAV pod from the second two-rotor UAV so that the launching and receiving of the second two-rotor UAV to accomplish the third one of the plurality of flight missions happens autonomously and without active human intervention.

An unmanned aerial vehicle (UAV) operational system may include a UAV pod having a pod memory and a pod processor, the pod memory storing a first plurality of UAV flight mission information that is adequate to survey a geographic coverage area at a predetermined refresh rate and a UAV seated in the UAV pod, the UAV having a UAV memory storage and a UAV processor, the UAV memory storing one of the first plurality of UAV flight missions so that each one of the plurality of UAV flight missions represents a launch, survey and landing of the UAV. The system may also include survey data from at least one of the first plurality of UAV flight missions stored in the pod memory or survey data from at least one of the first plurality of UAV flight missions stored in a second pod memory so that the second pod memory includes portable memory detachably connected to the UAV pod. The UAV pod may additionally include a transceiver in communication with the pod processor, the pod processor configured to transmit the survey data to an operational support center positioned remotely from the UAV pod. The system may also include a customer support center configured to receive a first data request from a customer via electronic communications and wherein the first data request also includes a first geographic coverage area and a refresh rate for the first geographic coverage area. In such embodiments, the first data request may also include one of a ground resolution or ground sample distance (GSD). In embodiments, the system includes a transceiver in the UAV, the transceiver configured to communicate with the UAV pod.

A method of migrating unmanned aerial vehicle (UAV) operations between geographic survey areas may include uploading a first plurality of flight missions into a first UAV pod, deploying the UAV pod, autonomously launching the UAV from the UAV pod a plurality of times to perform the first plurality of flight missions, providing first survey data from the UAV to the UAV pod, autonomously migrating the UAV from the first UAV pod to a second UAV pod, receiving a second plurality of flight missions in a second UAV pod, providing the UAV with one of the second plurality of flight missions from the second UAV pod, autonomously launching the UAV from the second UAV pod a plurality of times to perform the second plurality of flight missions, and providing a second survey data from the UAV to the second UAV pod so that the autonomous migrating of the UAV to accomplish the first and second survey data happens autonomously and without active human intervention. In other embodiments, the method may also include performing data analysis of the first and second survey data and providing the data analysis to the customer.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

A vertical takeoff and landing (VTOL) unmanned aerial vehicle (UAV) system is disclosed that provides for improved remote geographic survey capabilities. Multiple autonomous missions launches and landings may be accomplished using a two-rotor VTOL UAV that is capable of efficient horizontal flight.

More particularly, a geographic survey method is described that may include receiving a first data request from a remote customer, with the first data request including a first geographic coverage area and a refresh rate for the first geographic coverage area, planning a series of UAV flight missions to accomplish the first data request, uploading flight missions data representing the series of flight missions into a VTOL UAV pod (referred to herein simply as a "UAV pod"), and then deploying the UAV pod to a remote site for extended and autonomous survey work by the enclosed two-rotor UAV, such as through the use of multiple autonomous launches, landings and data retrieval missions. In its broadest sense, the system may be accomplished using a single UAV pod and selectively enclosed two-rotor VTOL UAV for efficient long-range survey work. In other embodiments, one or more two-rotor UAVs may be used and shared with one or more VTOL UAV pods to extend the autonomous survey range and coverage of the UAVs between adjacent or non-adjacent geographic survey regions.

The present invention allows for a customer to make a data request related to a geographic coverage area and a refresh rate related to that geographic coverage area. A UAV accomplishes a series of flight missions related to the customer data request and collects flight missions data. The flight missions data is processed and provided to the customer.

Exemplary UAV pod and UAV Structure

Figure 1:
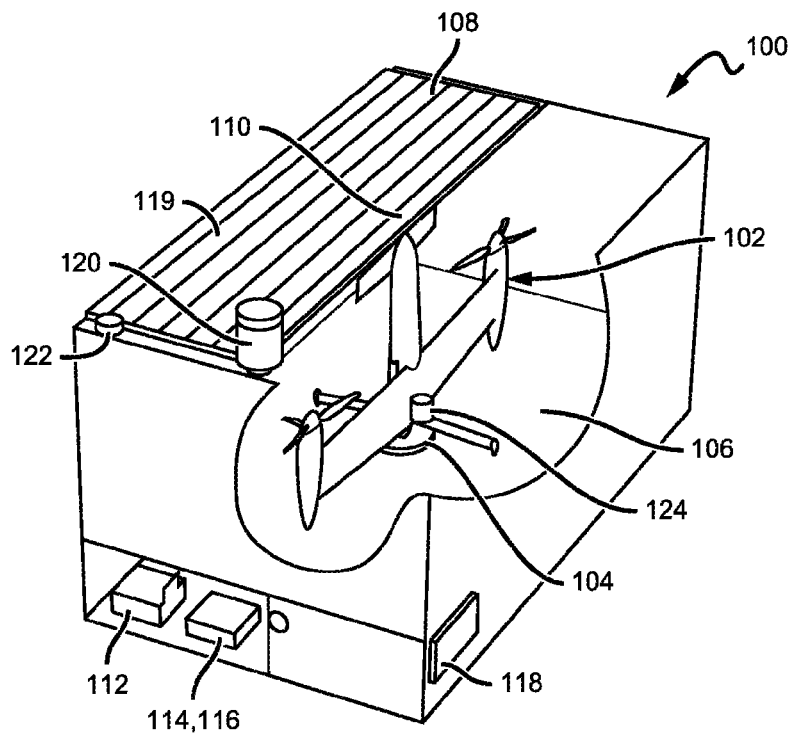
FIG. 1 is a perspective view of one embodiment of a UAV pod that may house and protect an extended range VTOL UAV to accomplish multiple autonomous launches, landings and data retrieval missions.

FIG. 1 is a perspective view of one embodiment of a UAV pod that may house and protect an extended range VTOL UAV to accomplish multiple autonomous launches, landings and data retrieval missions. The illustrated system 100 has a winged two rotor UAV 102 seated on a landing surface 104 of an interior 106 of the UAV pod 108. The UAV 102 is seated in a vertical launch position to facilitate later launch out of the UAV pod 108. The UAV pod 108 may selectively enclose the UAV 102, such as through the use of a UAV pod protective cover 110. The cover 110 may be a two- part hinged cover that is operable to close to protect the UAV 102 from the external environment or to open to enable launch of the UAV 102. The UAV pod 108 may have a short-range UAV pod transceiver 112 that may be seated in a compartment below the landing surface 104, within their own separate compartments, or may be seated elsewhere within the UAV pod 108 for protection from the external environment. The UAV pod transceiver 112 may receive UAV flight telemetry such as UAV flight and trajectory information, UAV battery status information and sensor data (such as video), and other data transmitted by the UAV 102. The UAV pod transceiver 112 may also transmit flight control data such as navigation (e.g., re-routing instructions) to the UAV 102. A UAV pod processor 114 may also be housed within the UAV pod 108 to accomplish, among other functions, providing the UAV 102 with a plurality of missions, receiving flight survey data from the UAV 102, monitoring the UAV pod 108 for overhead obstacles, monitoring the external environment such as the weather through the weather sensor, monitoring the trajectory of the UAV 102, and providing navigation instructions to the UAV 102 in response to receiving UAV battery status or other flight warning condition data inputs.

A UAV pod memory 116 may also be housed within the UAV pod 108 for storing UAV flight mission information and geographic survey data. A battery 118 may be enclosed in the UAV pod for recharging the UAV 102 and for providing power to the UAV pod 108 such as for use by the processor 114 and cover motor (not shown). The battery 118 may be rechargeable such as through solar panels 119, or may be a permanent battery such as a 12-Volt deep cycle marine battery. In an alternative embodiment, the battery 118 may be a fuel cell. In some embodiments, the UAV pod 108 will use the solar panels 119 to charge the battery 118 to later charge the battery of the UAV 102. Typically, the UAV pod 108 will be charging the battery 118 while the UAV 102 is out of the pod 108 executing a mission and will recharge the UAV 102 upon its return to the UAV pod 108.

A weather sensor 120 in communication with the UAV pod processor may extend from an exterior of the UAV pod 108 to enable accurate measurement of the external environment, such as wind speed, temperature and barometric pressure. A proximity sensor or sensors may also be provided (122, 124) and in communication with the UAV pod processor 114 to enable go and no-go flight decisions based on the proximity of any objects or other obstructions positioned over the UAV pod cover 110. The UAV pod 108 is preferably weather hardened to enable extended outdoor use regardless of weather variations.

Figure 2:
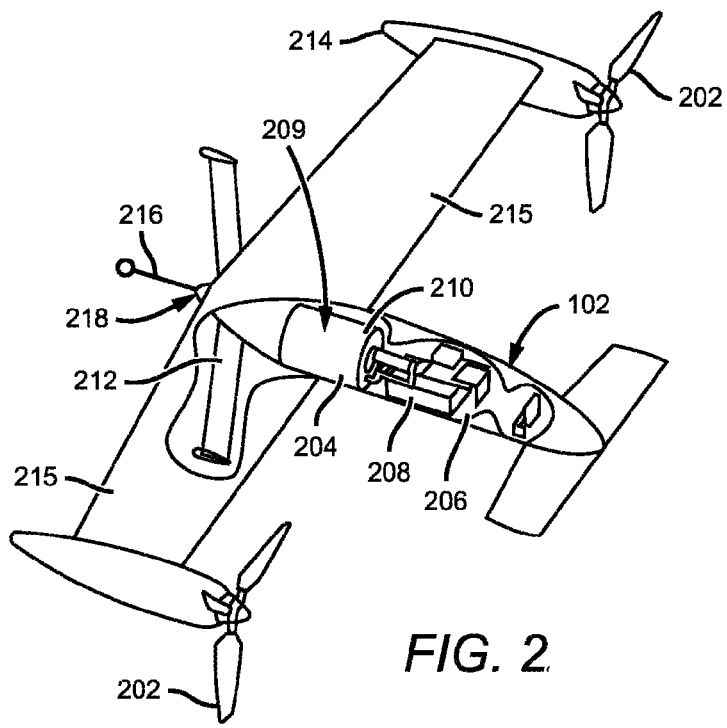
FIG. 2 is a perspective view of the two-rotor UAV first illustrated in FIG. 1.

FIG. 2 is a perspective view of the two-rotor UAV 102 first illustrated in FIG. 1. The UAV 102 has only two rotors 202 though enabling vertical takeoff and landing (VTOL) missions out of the UAV pod 108 (see FIG. 1). The UAV 102 has a UAV transceiver 204 within a UAV fuselage 206. A UAV processor 208 is also seated in the UAV 102 and in communication with the UAV transceiver 204. The UAV 102 also includes a battery 209 for providing power to the rotor motors and the electronics, including the processor 208. The UAV processor 208 is configured to receive a plurality of flight mission information that may include waypoints, altitude, flight speed, sensor suite configuration data, launch day/time and mission weather sensor go and no-go parameters. The UAV 102 may have a variety of electrical optical (EO) sensors 210, such as LiDAR, RADAR, infrared, visible- spectrum cameras, or other active or passive sensors that may be used to detect soil moisture, crop density, crop health, terrain, or other objects or qualities of interest. The UAV 102 may have a rear landing gear 212 extending off of a rear of the fuselage 206 that may be used in combination with UAV engine nacelles 214 to enable a four-point landing for more stable landings on the UAV pod 108 (see FIG. 1). The landing gear 212 may also function as a flight surface or aerodynamic surface, such as a vertical stabilizer, providing corrective (passive) forces to stabilize the UAV 102 in flight, such as to stabilize in a yaw direction. The UAV 102 may have wings 215 to provide the primary source of lift during the UAV cruise (e.g., horizontal flight), while the two rotors 202 provide the primary source of lift during the VTOL phases of UAV flight. This combination of wing and rotor use allows for efficient flight while collecting flight survey data, which increases the range and/or duration of a particular flight while also allowing the UAV 102 to land and take off from the relatively small UAV pod 108 (see FIG. 1) landing area. In one embodiment, the UAV 102 may take off and land vertically using the two rotors 202 that themselves are operable to lift the UAV 102 vertically upwards, transition the UAV 102 to horizontal flight to conduct its survey or other flight mission, and then transition it back to vertical flight to land the UAV 102 vertically downwards, with attitudinal control for the UAV 102 in all modes of flight (vertical and horizontal) coming entirely from the rotors 202 (as driven by a means of propulsion) without the benefit or need of aerodynamic control surfaces, such as ailerons, an elevator, or a rudder. One such UAV 102 is described in international patent application number PCT/US14/36863 filed May 5, 2014, entitled "Vertical Takeoff and Landing (VTOL) Air Vehicle" and is incorporated by reference in its entirety herein for all purposes. Such a UAV 102 benefits from a more robust structure by reducing the opportunity for damage to control surfaces (i.e., there aren't any), and may be made lighter and with less complexity.

The UAV 102 may also be provided with a rearward facing tang 216 extending off of a rear portion 218 of the fuselage 206 in lieu of or in addition to rear landing gear 212. Such rearward-facing tang 216 may be metallic or have metallic contacts for receipt of electrical signals (i.e., data) and/or power for charging the UAV's battery 209.

Figure 3:
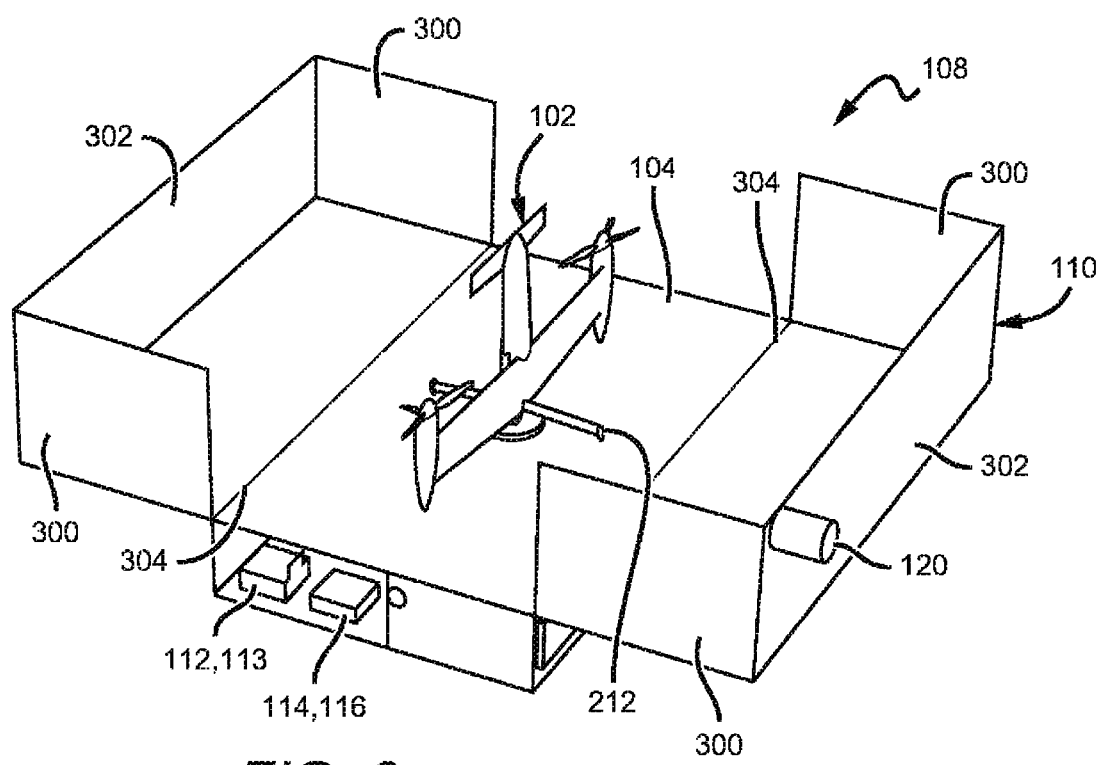
FIG. 3 illustrates the UAV pod 100 in its open configuration.

FIG. 3 illustrates the UAV pod 108 in its open configuration. In FIG. 3, the UAV 102 is illustrated in its vertical configuration and seated on a landing surface 104 of the UAV pod 108. The UAV 102 is shown positioned at least generally aligned with the rectangular dimensions of the UAV pod 108. In embodiments, the landing surface 104 is rotatable to position the UAV. The cover 110 is open to enable unobstructed launch, and later landing, of the UAV 102. The cover 110 is illustrated with side portions 300 and top portions 302, with hinges 304. In an alternative embodiment, only the top portions 302 are hinged to enable unobstructed launch of the UAV 102. Alternatively, the top portions 302 may translate out of the flight path linearly or using a mechanism and motion so that the UAV is free to launch. In one embodiment, the landing gear 212 may be omitted and the UAV 102 may be guided into and out of one or more slots, guide rails, channels, or other guiding structure to both secure the UAV 102 during its landed state and enable landing. The weather sensor 120 may be coupled to the cover 110 or may extend off the side of the UAV pod 108 (not shown). Also, although the UAV pod 108 is illustrated having a rectangular cross-section and a box—like structure, the UAV pod 108 may take the form of a dome-shaped structure or other configuration that enables stable placement and protection for the selectively enclosed UAV. The cover 110 can include solar panels on its exterior (not shown), and in some embodiments one or both of the covers 110 can be positioned, and moved, about the hinges 304 to be perpendicular to the sun's rays to maximize the collection of solar energy.

Business Methods of Operation

Figure 4:
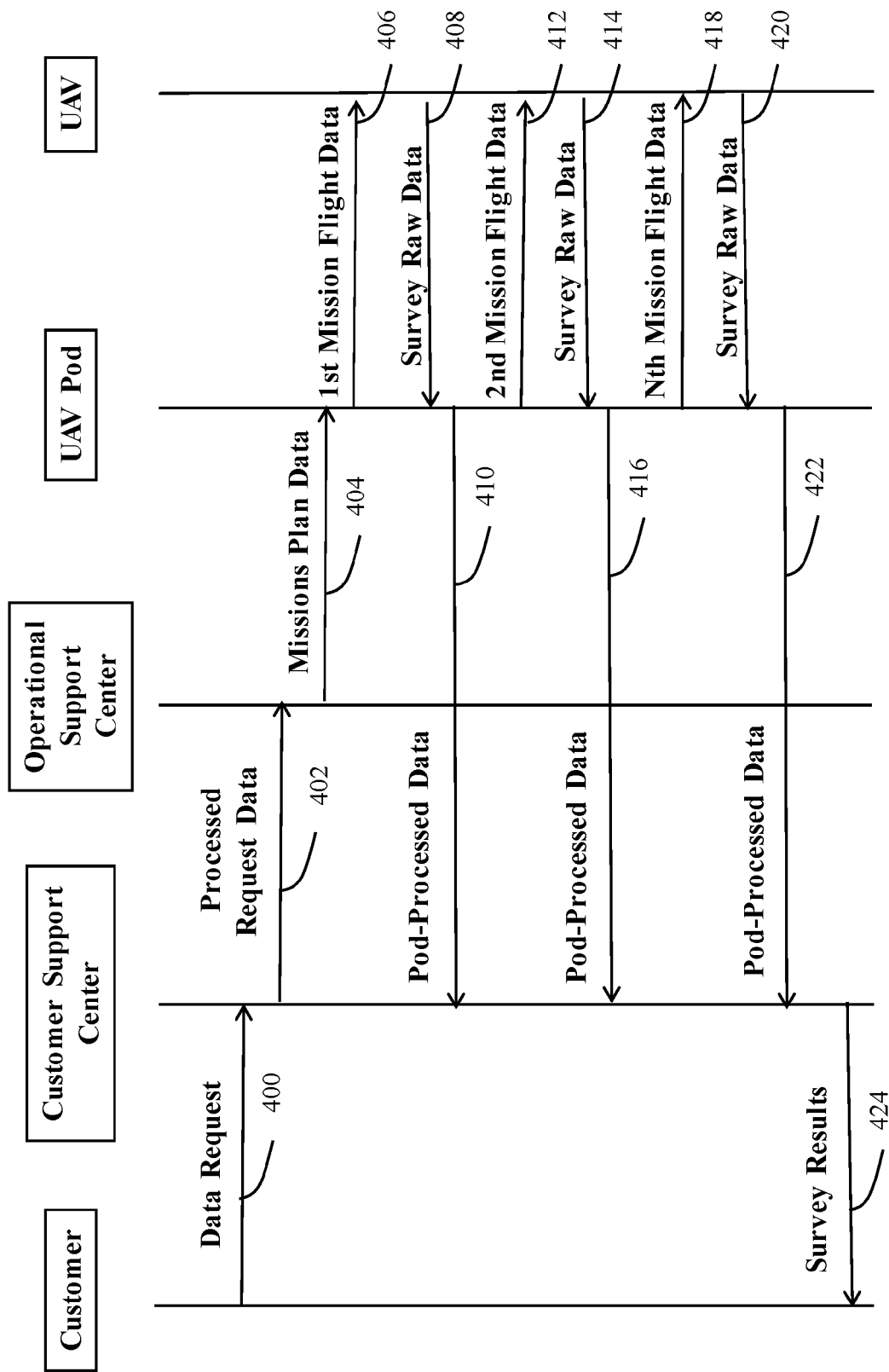
FIG. 4 is a data flow diagram illustrating information flow from a customer requesting data, to a customer support center, an operational support center and to a UAV in a UAV pod and back again.

FIG. 4 is a data flow diagram illustrating information flow from a customer requesting data to a customer support center, an operational support center, a UAV in a UAV pod, and back again. A customer may submit a data request 400, such as a request for a geographic aerial survey, to a customer support center. The customer support center may work with the customer and received data to finalize the data request for transmission 402 to an operational support center. The operational support center may use the finalized data request to determine the location of a launch site in or adjacent to a UAV pod survey site, to plan a plurality of flight missions that collectively accomplish the customer's geographic survey data request. The resultant missions plan data may then be provided 404 to a UAV pod that may be deployed to the launch site. Prior to launch, the first of the plurality of missions is provided to the UAV 406 in the form of flight data, such as altitude, heading, and way points, and the UAV is launched to perform the mission. Upon return of the UAV to the UAV pod, the survey raw data, such as camera imagery, event logs, GPS and IMU raw data, may be provided 408 to the UAV pod. In one embodiment, the UAV pod may pre-process the data, such as by converting the raw data into viewable JPGs with an accompanying geospatial location. Additional pre-processing may be performed, such as stitching the images into an orthomosaic. In a further embodiment, such pre-processing may be performed onboard the UAV prior to providing the data to the UAV pod. The pre-processed data may be provided 410 to the customer support center for final processing.

The next mission's flight data may be provided 412 to the UAV and the UAV may be launched to perform the next survey mission. Upon its return, the survey raw data may be provided 414 to the UAV pod for pre-processing and the pre-processed data may then be provided 416 to the customer support center for additional processing. With the UAV receiving the last mission flight data 418 and upon receipt by the UAV pod of the final survey raw data 420, the final pod-processed data may be provided 422 to the customer support center. After final processing of the collective missions pre-processed data, the survey results may be provided 444 by the Customer Support Center to the customer.

Figure 5:
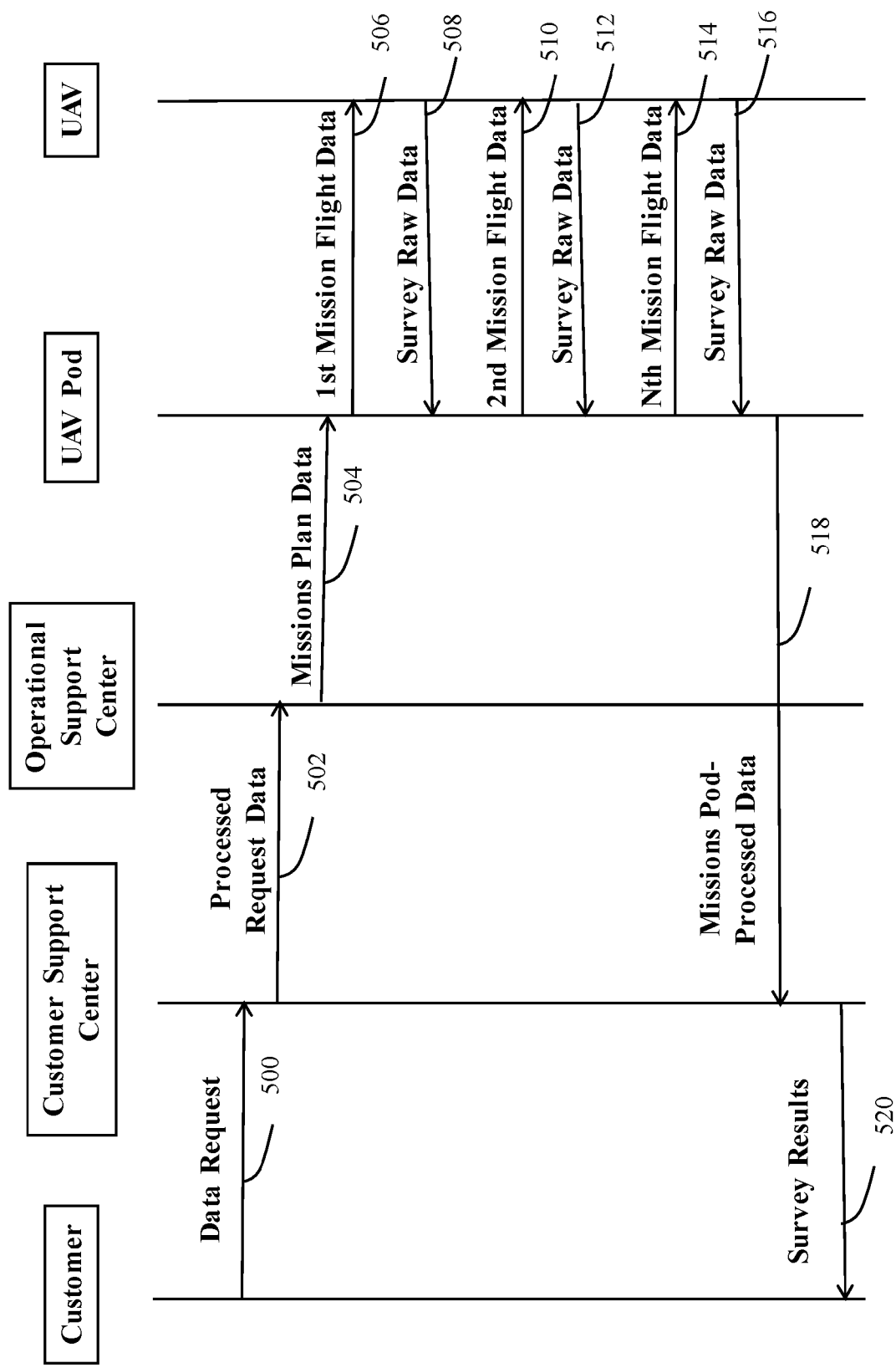
FIG. 5 is a data flow diagram illustrating another embodiment of the flow of information from a customer requesting data, through a customer support center to an operational support center, to a UAV in a UAV pod and back again to the customer.

FIG. 5 is a data flow diagram illustrating another embodiment of the flow of information from a customer requesting data, to a customer support center to an operational support center, to a UAV in a UAV pod and back again to the customer. As illustrated above, the customer may submit the data request 500 to the customer support center that may then finalize the data request for transmission 502 to an operational support center. The processed requested data is used to develop a plurality of flight missions that collectively accomplish the customer's data request. The resultant missions plan data may then be provided 504 to the UAV pod that may deployed to the launch site, and the first mission's flight data provided 506 to the UAV prior to launch and accomplishment of the first flight survey mission. The pre-processed survey data may be provided 508 to the UAV pod for storage, and the second mission's flight data provided 510 to the UAV to conduct the second mission's survey. Upon returning to the UAV pod, the second mission's pre-processed flight data may be provided 512 to the UAV pod. After the last mission's flight data is provided 514 to the UAV by the UAV pod and after conclusion of the last flight mission survey, the last mission's flight survey data may be provided 516 to the UAV pod and the collective missions' pod-processed survey data provided 518 to the customer support center for final processing before providing 520 the finally-processed survey data to the customer.

Figure 6:
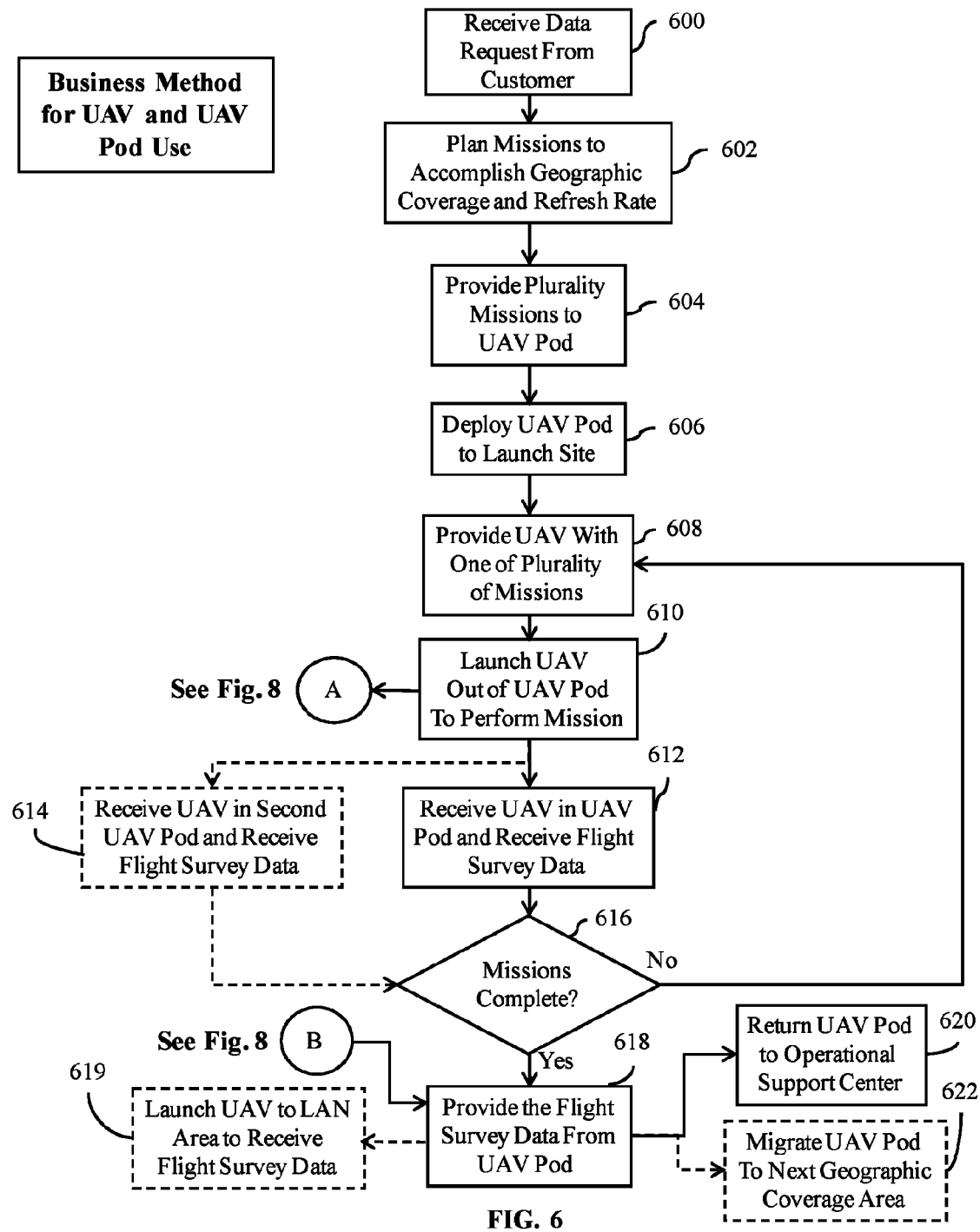
FIG. 6 is a flow diagram illustrating one embodiment of use of the UAV pod and UAV system by a customer.

FIG. 6 is a flow diagram illustrating one embodiment of use of the UAV pod and UAV system by a customer. A first data request is received from a customer, such as an owner of an agricultural field or land use manager (block 600). The customer may input the data request through a website portal that requests information detailing the request. For example, the customer may wish to provide geographic boundaries to survey a first geographic coverage area during a specific period of time to accomplish a refresh rate. "Refresh rate" refers to the number of times each area of the geographic coverage area is imaged during the deployment period for that geographic coverage area. In other embodiments, the data request may include a ground resolution or ground surface distance ("GSD"). For example, a GSD of one inch may enable the coverage areas and refresh rates described in Table 1.

TABLE 1

|  | Example 1 | Example 2 | Example 3 |
|---|---|---|---|
| UAV Deployment Period | 90 days | 90 days | 90 days |
| UAV Missions | 360 | 360 | 360 |
| GSD | 1 inch | 1 inch | 1 inch |
| Coverage Area | 100,000 | 12,500 | 6,250 |
| Refresh Rate | 1 (once/90 days) | 8 (once/11 days) | 16 (once/6 days) |

Similarly, by suitably modifying GDS values, the UAV may have the coverage area and refresh rates listed in Table 2.

TABLE 2

|  | Example 4 | Example 5 | Example 6 | Example 7 |
|---|---|---|---|---|
| UAV Deployment Period | 90 days | 90 days | 90 days | 90 days |
| UAV Missions | 360 | 360 | 360 | 360 |
| GSD | 2 inch | 4 inch | 0.5 inch | 0.25 inch |
| Coverage Area (acres) | 100,000 | 12,500 | 50,000 | 25,000 |
| Refresh Rate | 2 (once/45 days) | 4 (once/23 days) | 1 (once/90 days) | 1 (once/90 days) |

In other embodiments, rather than inputting the data request through a website portal, the customer may provide the data through a proprietary software interface or via a telephone interview mechanism, each in communication with a customer support center. A plurality of flight missions may then be planned that collectively accomplish the customer's (block 602) request such as by pre-planning how many flights and from what general areas they need to operate. The planned flight missions, such flight missions including flight mission data representing takeoff day/time, waypoints, flight altitudes, flight speeds, and such, are provided to the UAV pod (block 604) for future communication to a UAV seated in the UAV pod.

The UAV pod may then be deployed to a launch site that is either within or adjacent to the customer—desired geographic coverage area (block 606). Deployment may consist of loading the UAV into a UAV pod and transporting both to the launch site by means of truck or aircraft transport. By way of further example, the UAV pod and enclosed UAV may be transported by a commercial carrier (e.g., FedEX, UPS, etc.) to a farm for offloading into a field, or by an oil and gas utility company to a location adjacent a transmission or pipeline that may be the subject of a visual survey. The UAV may be provided with flight mission data representing one of the plurality of missions (block 608) such as by short range wireless or wired communication within the UAV pod. The UAV may then be launched out of the UAV pod to perform the provided flight mission (block 610). As described herein, a "mission" or "flight mission" preferably encompasses one launch, survey flight, and landing, but may encompass more than one launch/flight/landing. The flight mission data may also include dynamic flight instructions, such as altering its trajectory, attitude or such as by dropping a payload if certain conditions exist, such as would be valuable in a search and rescue mission if the plan locates the sought after object or person.

After completion of the flight mission, or in response to a rerouting request received by the UAV, the UAV is received in the UAV pod and the flight survey data is provided to UAV pod memory (block 612). In an alternative embodiment, rather than returning to the original UAV pod, the UAV flies to and is received by a second UAV pod (block 614). Such an alternative embodiment may be utilized in order to transition the UAV into an adjacent geographic survey region for receipt of a new plurality of missions for a second geographic survey. Alternatively, such an embodiment may be used to provide for an extended geographic area survey, one that would ordinarily not be accomplished with a single UAV due to the UAVs inherent power/range limitation. If all missions in the plurality of missions have not yet been completed (block 616), then the next one of the plurality of missions is provided to the UAV (block 608) and the UAV is again launched out of the UAV pod autonomously (i.e., without human intervention) to perform the next survey flight mission and the UAV may return to the UAV pod after completing the flight mission and the recorded survey data provided to the UAV pod. Otherwise, if all missions are completed (block 616), then the completed flight survey data may be provided from the UAV pod (block 618). The survey data may be provided to UAV pod memory that is in the form of detachable memory in the UAV pod, such as SD cards, USB flash memory, or otherwise detachable and portable memory, to a UAV pod servicer, or may be provided wirelessly through a cell phone connection, WLAN or LAN connection, or satellite-enabled transceiver. In an alternative embodiment, the UAV is routed to a LAN area for the LAN to receive the flight survey data wirelessly during flight and before returning for landing in the UAV pod (block 619).

As shown in FIG. 6, the UAV pod (which may now include the UAV) may then be retrieved and returned to an operations support center (block 620). A second plurality of flight missions may then be uploaded into the UAV pod to accomplish a second data request from the same or a different customer and the UAV pod re-deployed. In an alternative embodiment, rather than returning the UAV pod to a support center, the UAV pod may be moved or migrated (block 622) to a second or next geographic coverage area for further use.

In a further alternative embodiment, the UAV pod may be deployed to a launch site prior to providing the UAV pod with flight missions data representing the planned flight missions. In such a scheme, the UAV pod may establish or join a local LAN connection for receipt of the planned flight missions on-site.

Figure 7:
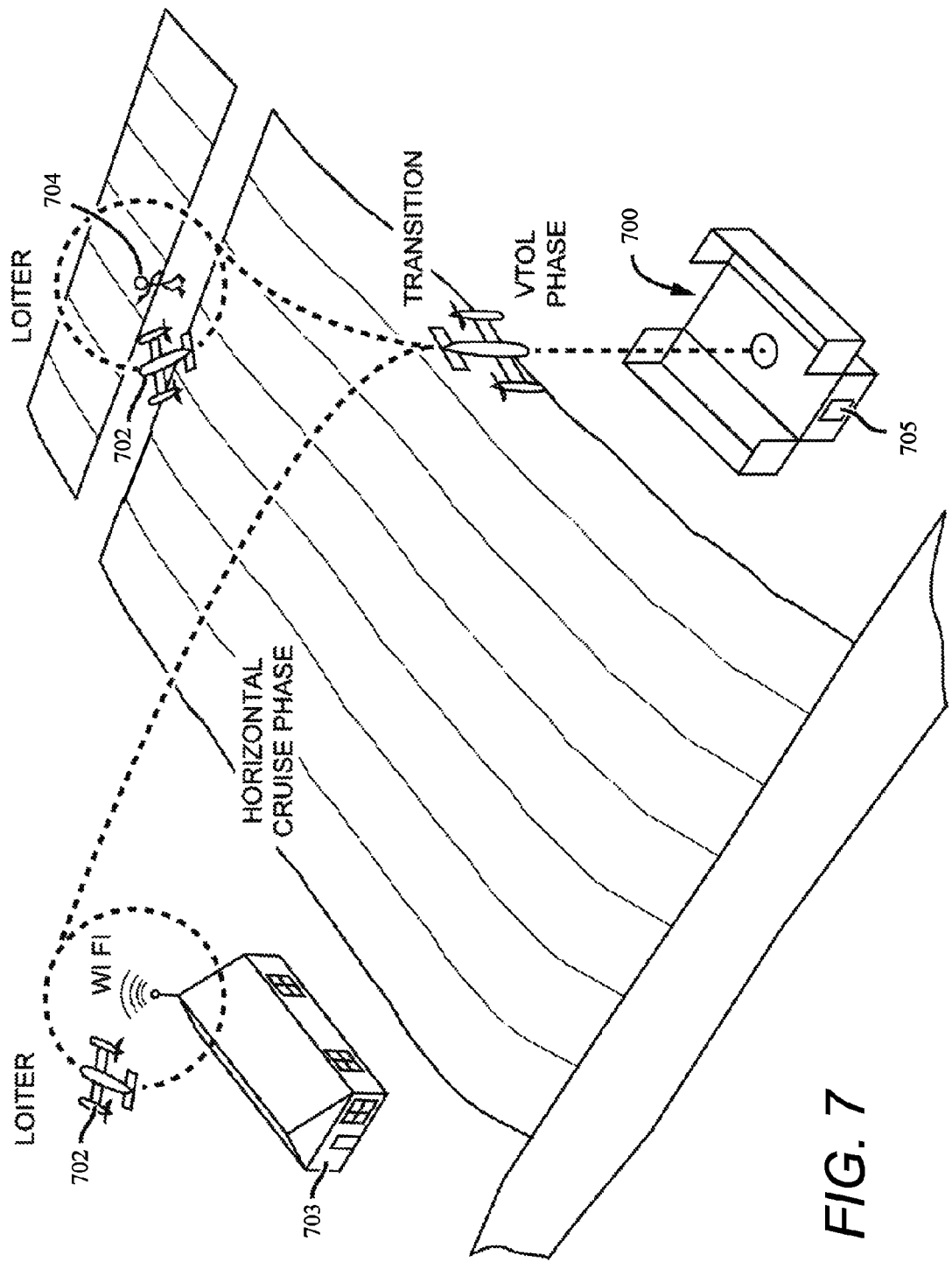
FIG. 7 shows a pod that due to its rural location lacks a wireless data connection and the UAV 2602 has flown from its pod to loiter above a house to be within range of the house's WiFi connection.

FIG. 7 shows a pod 700 that due to its rural location lacks a wireless data connection and the UAV 2602 has flown from its pod 700 to loiter above a house 703 to be within range of the house's WiFi connection. This allows the UAV 2602 to download data to either a server at the house 703 or to another location via an Internet connection. The UAV 702 can either store the data on board and then transmit it via the WiFi connection or relay a signal from the pod 700 to the WiFi.

FIG. 7 also shows that the UAV 702 could also transmit information by means of a physical act, such as loitering over an event of interest determined by the prior collection and processing of data. One example of such an event of interest could be the location of a lost person 704 or the location of an area of farmland that need additional water.

The flight survey data provided to UAV pod memory (perhaps detachable memory), provided wirelessly from the UAV pod, or even provided to a local LAN as described above, may be in raw or pre-processed form. For example, the flight survey data may simply be "zipped" and relayed to a remote processing station where all of the data is processed. Pre-processing the flight survey data prior to providing such from the UAV pod or directly from the UAV provides advantages, however. Data transmission bandwidth requirements may be reduced from what would otherwise be needed to transmit raw data for processing to an operational support center. A reduction in transmission bandwidth requirements may translate into reduced data transmission costs and time. In a preferred embodiment, either the UAV processor 208 (see FIG. 2) or UAV pod processor 114 (see FIG. 1) may pre-process the UAV-captured raw data (e.g., block 618, see FIG. 4). The UAV-captured raw data such as camera imagery, event logs, GPS and IMU raw data may be converted into viewable JPGs with accompanying geospatial location (i.e., "geo-tagging") for transmission. However, additional pre-processing may be performed either by the UAV processor or UAV pod processor. For example, the JPG images and accompanying geospatial location may be further processed to stitch the images into an orthomosaic so that what is sent from the UAV pod or from the UAV itself is a single high resolution image covering the entire flight survey area (or from an individual flight mission) resulting in the lowest bandwidth needed for transmission and the highest level of automation of pre-processing for the ultimate customer for measuring roads, buildings, fields, identifying agricultural progress, inspecting infrastructure, urban planning, and other analysis.

As shown in FIG. 7, the UAV pod 700 may include an interface and display 705 to provide the collected data and processed data for use at site without the need for transmission from the pod 700 to an offsite location. For example, the display 705 may be used to inform local users (e.g., farmhands) of areas that need additional watering or the like.

Local UAV Operation

Figure 8:
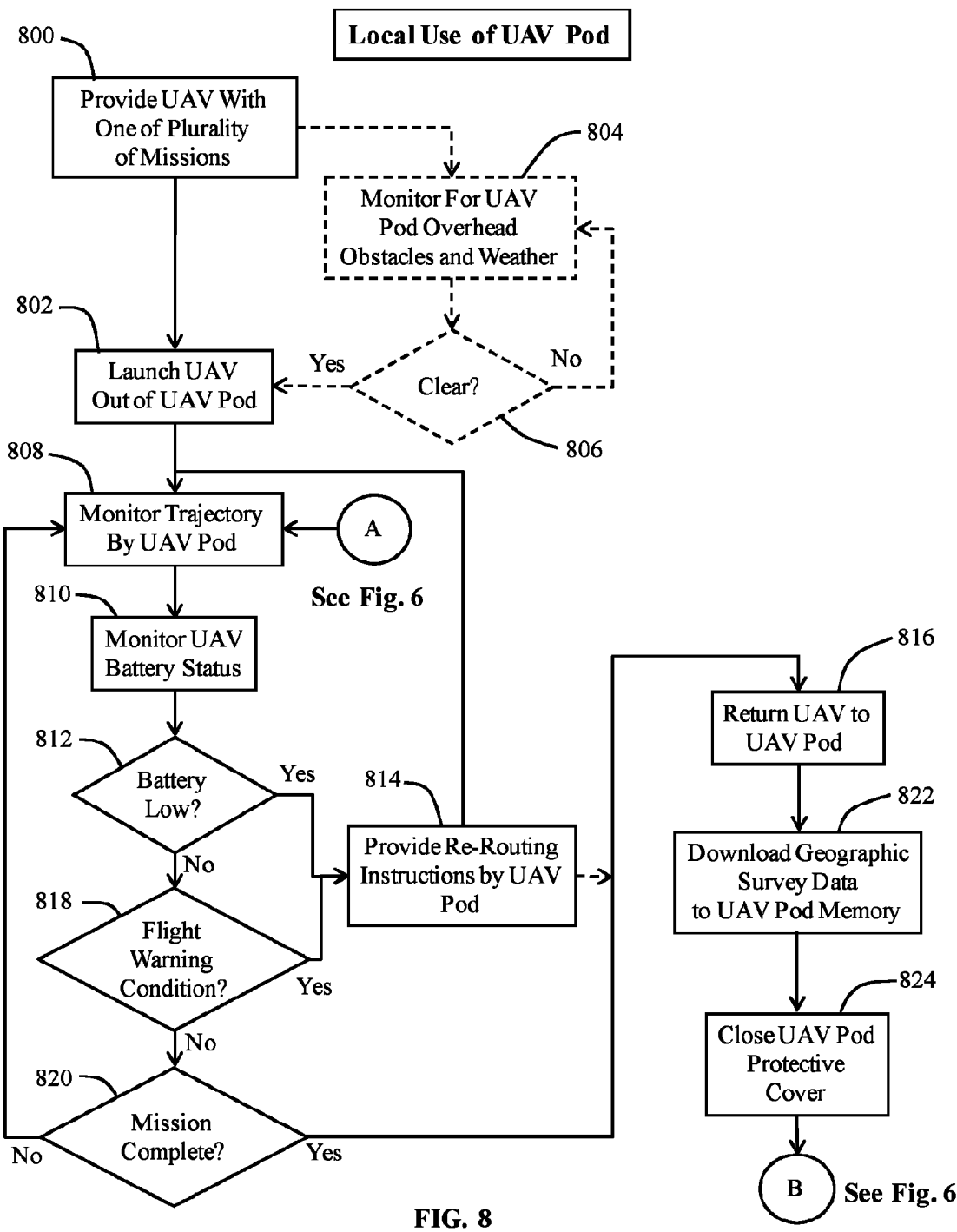
FIG. 8 is a flow diagram illustrating one embodiment of a method of conducting flight missions for the UAV.

FIG. 8 is a flow diagram illustrating one embodiment of a method of conducting flight missions for the UAV. The UAV may be provided with one of the plurality of missions (block 800) that reside in the UAV pod. The UAV may be launched vertically out of the UAV pod (block 802), preferably under its own power using the two rotors on the UAV. In one embodiment, the immediate environment over the UAV pod is monitored for obstacles and weather (block 804) that may otherwise interfere with launch of the UAV. In such an embodiment, if no obstructions are detected (block 806), then the UAV may be launched out of the UAV pod (block 802). Otherwise, launch of the UAV is delayed or cancelled and the UAV pod continues to monitor for overhead obstacles and weather (block 804, 806), as well as the UAV battery status (block 810). After launch, the UAV pod may monitor the UAV's trajectory (block 808). If UAV battery power is low or otherwise drops below a predetermined voltage threshold (block 812), then the UAV pod may provide rerouting instructions to the UAV (block 814) to shorten the current mission to enable a safe return of the UAV to the UAV pod. In an alternative embodiment, the UAV is directed to return immediately to the UAV pod (block 816) or to an intermediate pre-determined position. If, however, the battery is not low (block 812), and no other flight warning condition is triggered (block 818) the mission continues (block 820). If the current UAV mission has been completed (block 820), the UAV returns to the UAV pod (block 816) for landing and the geographic survey data is downloaded to the UAV pod memory (block 822) such as by a wireless or wired transfer of the mission data to the UAV pod memory. The UAV pod protective cover may be closed (block 824) to protect the UAV from the external environment (i.e., rain, direct sun, vandals, or damaging particulate matter).

Methods of General Survey Use—Contiguous Survey Areas

Figure 9:
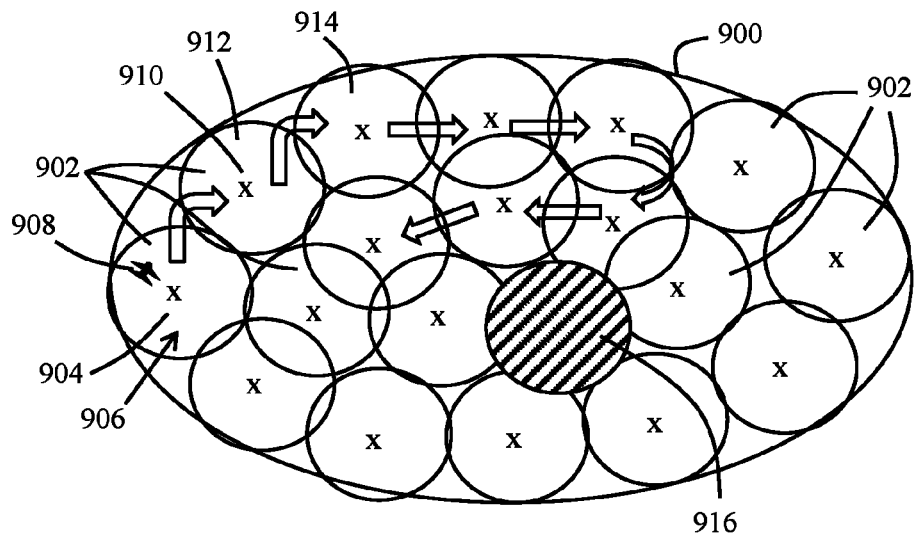
FIG. 9 is a block diagram illustrating the use of a plurality of UAV pods with only one UAV to extend the possible geographic survey area from what would otherwise exist with only one UAV.

While embodiments of the system thus far are described within the context of a flight survey using only one UAV pod, it is contemplated that a customer of the system may request a geographic coverage area that extends beyond the capabilities of a single UAV and UAV pod combination. FIG. 9 is a block diagram illustrating the use of a plurality of UAV pods with only one UAV to extend the possible geographic survey area from what would otherwise exist with only one UAV. An operator of the system may review the customer request and allocate n number of UAV pods for deployment at a given UAV pod spacing. An extended geographic survey area 900 may thus be divided into a plurality of individual geographic survey areas 902 for mission planning purposes. A respective plurality of UAV pods (each indicated by an 'X') may be deployed in predetermined launch locations so as to substantially cover the extended geographic survey area 900 and a communication network established to allow a single human manager to monitor the setup of the entire network of UAV pods. The size of each coverage or survey area 902 and the positioning of the pods across the area 900, may vary by a variety of factors including the range, flight time, recharge time, sensor or sensors of the UAV to be employed in that area 902, the frequency of the survey, the weather or season (as they may affect performance of the UAV and/or the charging capabilities of the pod), obstacles and obstructions, wireless communications between the pod and either the UAV, other pods, cellular network, or other radio system, dispersion of other pods in adjacent areas, and the like. The positioning of the pods may also be affected by the ability to position or deliver the pods to desired locations given the accessibility provided by local roads and terrain. A UAV pod 904 having a pre-loaded UAV may be deployed having a plurality of preloaded missions that are collectively sufficient to survey the immediately—surrounding coverage area 906. After the UAV has autonomously completed the missions to survey the immediately—surrounding coverage area 906, the UAV 908 may be transitioned to the next predetermined UAV pod 910 for recharging (or refueling) and to receive the first of a next plurality of flight missions to cover the second immediately—surrounding coverage area 912. Through the use of a plurality of missions designed specifically to collectively cover the second coverage area 912, the UAV may then migrate to the next coverage area 914 and so on until the entire extended coverage area 900 has been surveyed. In one embodiment, a non-coverage area 916, such as a lake, mountain, forest, city, non-farm land, or other area that is not of interest, is included in the extended coverage area 900 and may be avoided from survey activities to possibly extend the serviceable area for the UAV.

In an alternative embodiment that recognizes the autonomous landing capability of the UAV, the UAV, rather than transitioning to the next individual geographic survey area 902 or to the next individual geographic survey areas 902, the UAV may fly to a predetermined data offloading waypoint, such as a customer's farm house or automobile, to establish or join a local LAN connection or to establish a wireless connection to provide a data dump of geographic survey data.

In a further alternative embodiment, more than one UAV may be provided within the extended geographic survey area 900, with each UAV having a different sensor suite to gather complementary data for the customer. In such a scheme, each UAV may survey the entire extended geographic survey area 900 by transitioning through the plurality of individual geographic survey areas 902 over time, or to only a subset of each area 900, to obtain a more complete understanding of the area 900 than would be possible with only a single UAV sensor suite.

Also, although the prior description describes one UAV for each UAV pod, in an alternative embodiment, each UAV pod may selectively encompass, provide power for, and distribute missions to two or more VTOL UAVs. In some embodiments, each pod deployed to a survey area 902 will include its own UAV to allow the given area 902 to be surveyed at the same time, or about the same, time or frequency as any other area 902. UAV pods in different areas 902 could contain UAVs with different sensors, or sensor suites, and the UAV pods could trade UAVs as necessary to obtain the desired sensor coverage.

Figure 10:
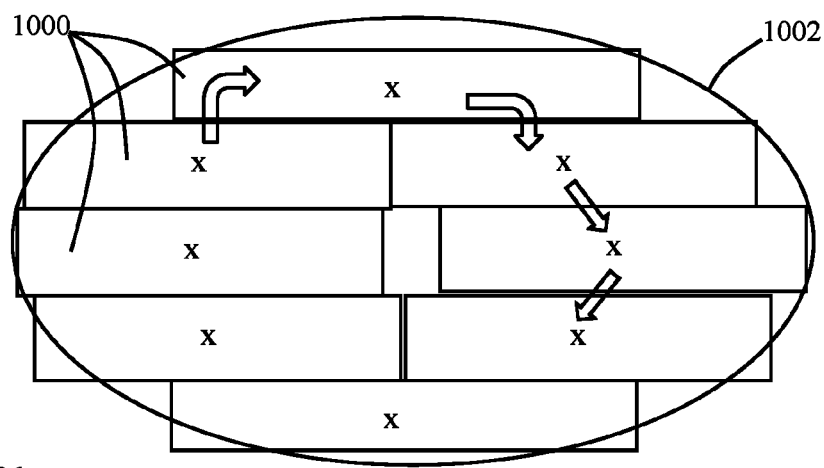
FIG. 10 is a UAV pod and associated UAV provided with a plurality of missions that cover a rectangular coverage area.

Although FIG. 9 illustrates each immediately—surrounding coverage area (e.g., 906, 912, 914) as being circular, a UAV pod and associated UAV may be provided with a plurality of missions that cover a rectangular coverage area 1000 (see FIG. 10) or a coverage area having different regular or irregular shapes to accomplish the overall goal of surveying an extended coverage area 1002 that could not otherwise be covered without the use of multiple UAVs or with UAVs having significantly greater range capabilities, as illustrated in FIG. 10.

Methods of General Survey Use—Non-Contiguous Survey Areas

Figure 11:
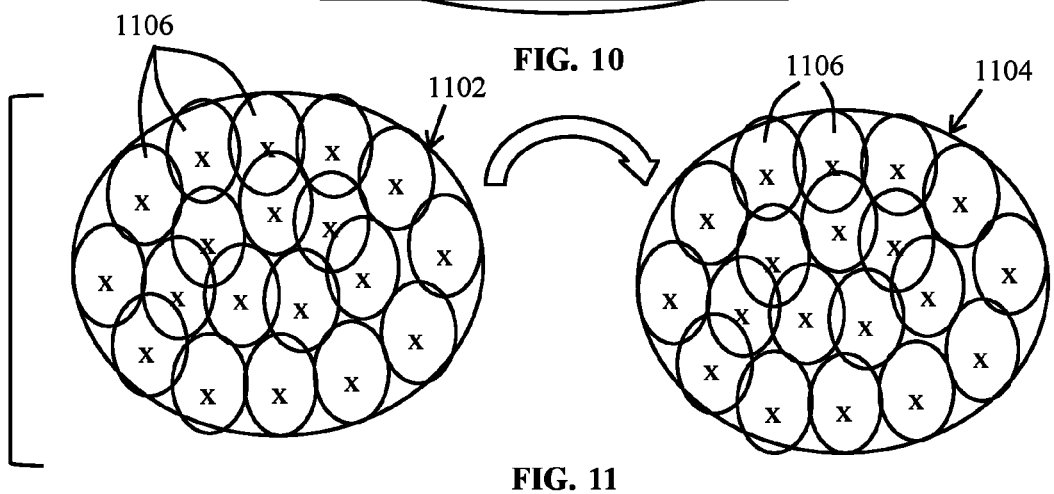
FIG. 11 illustrates two extended coverage survey areas that may be serviced using only one UAV or a limited number of UAVs.

FIG. 11 illustrates two extended coverage survey areas that may be serviced using only one UAV or a limited number of UAVs. The two extended coverage survey areas (1102, 1104) are not contiguous, but rather are separated into two distinct extended coverage areas. During a mission planning procedure, each of the two extended coverage survey areas (1102, 1104) are broken up into perspective area sets 1106 that are serviceable with a single UAV/UAV pod set. In such an arrangement, a single UAV may transition from one area set 1106 to the next within the first extended coverage survey area 1102 as the respective missions are completed, until transitioning to the next extended coverage survey area 1104.

While various embodiments of the invention have been described, it will be apparent to those of ordinary skill in the art that many more embodiments and implementations are possible that are within the scope of this invention.

What is claimed is:

1. A method of unmanned aerial vehicle (UAV) operation, comprising:
  receiving from a customer a first data request, the first data request comprising:
    a first geographic coverage area; and
    a refresh rate for the first geographic coverage area;
  planning a first plurality of flight missions to accomplish the first data request;
  uploading flight missions data representing the first plurality of flight missions into a UAV pod;
  deploying the UAV pod;

providing a two-rotor UAV with flight mission data for one of the first plurality of flight missions from the UAV pod;
launching the two-rotor UAV from the UAV pod to perform the one of the first plurality of flight missions;
receiving the two-rotor UAV on the UAV pod; and
receiving in the UAV pod a first flight survey data obtained from the one of the first plurality of flight missions from the two-rotor UAV.

2. The method of claim 1, wherein the first data request further comprises one of a ground resolution or ground surface distance (GSD).

3. The method of claim 1, further comprising:
transmitting the first flight survey data from the UAV pod.

4. The method of claim 1, further comprising:
providing the UAV with a second flight mission data representing a second one of the first plurality of flight missions from the UAV pod;
autonomously launching the two-rotor UAV from the UAV pod to perform the second one of the first plurality of flight missions;
receiving the two-rotor UAV on the UAV pod after completing the second one of the first plurality of flight missions; and
receiving a second flight survey data in the UAV pod from the UAV;
wherein the launching and receiving of the two-rotor UAV to accomplish the second one of the first plurality of flight missions happens autonomously and without active human intervention.

5. The method of claim 4, further comprising:
providing the second flight survey data from the UAV pod.

6. The method of claim 4, further comprising:
receiving the first and second flight survey data from the UAV pod.

7. The method of claim 6, wherein the receiving the first and second flight survey data from the UAV pod comprises receiving the first and second flight survey data wirelessly at a remote operational support center.

8. The method of claim 6, wherein the receiving the first and second flight survey data from the UAV pod comprises removing a physical memory from the UAV pod.

9. The method of 6, further comprising:
performing data analysis of the first and second flight survey data; and
providing the data analysis to the customer.

10. The method of 9, further comprising:
providing the two-rotor UAV with a third flight mission data representing a third one of the first plurality of flight missions from the UAV pod; and
receiving the two-rotor UAV on a second UAV pod.

11. The method of claim 10, further comprising:
receiving a second two-rotor UAV in the second UAV pod.

12. The method of claim 10, further comprising:
retrieving the UAV pod;
uploading a fourth flight missions data representing a second plurality of flight missions into the UAV pod to accomplish a second data request; and
re-deploying the UAV pod.

13. A method of unmanned aerial vehicle (UAV) operation, comprising:
receiving from a customer a first data request, the first data request comprising:
a first geographic coverage area; and
a refresh rate for the first geographic coverage area;
planning a first plurality of flight missions to accomplish the first data request;
uploading flight missions data representing the first plurality of flight missions into a UAV pod;
deploying the UAV pod; and
providing a second two-rotor UAV with a third flight mission data representing a third one of the first plurality of flight missions from the UAV pod.

14. The method of claim 13, further comprising:
autonomously launching the second two-rotor UAV from the UAV pod to perform the third one of the first plurality of flight missions;
receiving the second two-rotor UAV on the UAV pod after completing the third one of the first plurality of flight missions; and
receiving a third survey data in the UAV pod from the second two-rotor UAV;
wherein the launching and receiving of the second two-rotor UAV to accomplish the third one of the plurality of flight missions happens autonomously and without active human intervention.

15. A method of migrating unmanned aerial vehicle (UAV) operations between geographic survey areas, comprising:
uploading a first plurality of flight missions into a first UAV pod;
deploying the UAV pod;
autonomously launching the UAV from the UAV pod a plurality of times to perform the first plurality of flight missions;
providing first survey data from the UAV to the UAV pod;
autonomously migrating the UAV from the first UAV pod to a second UAV pod;
receiving a second plurality of flight missions in the-a second UAV pod;
providing the UAV with one of the second plurality of flight missions from the second UAV pod;
autonomously launching the UAV from the second UAV pod a plurality of times to perform the second plurality of flight missions; and
providing a second survey data from the UAV to the second UAV pod;
wherein the autonomous migrating of the UAV to accomplish the first and second survey data happens autonomously and without active human intervention.

16. The method of claim 15, further comprising:
performing data analysis of the first and second survey data; and
providing the data analysis to a customer.

* * * * *